(12) United States Patent
Wu

(10) Patent No.: US 7,861,177 B2
(45) Date of Patent: Dec. 28, 2010

(54) SOFTWARE CONFIGURATION PROGRAM FOR SOFTWARE APPLICATIONS

(75) Inventor: Yuh-Cherng Wu, San Jose, CA (US)

(73) Assignee: SAP Aktiengesellschaft, Walldorf (DE)

( * ) Notice: Subject to any disclaimer, the term of this patent is extended or adjusted under 35 U.S.C. 154(b) by 1032 days.

(21) Appl. No.: 10/829,145

(22) Filed: Apr. 21, 2004

(65) Prior Publication Data

US 2005/0240917 A1 Oct. 27, 2005

(51) Int. Cl.
*G06F 3/00* (2006.01)
*G06F 3/048* (2006.01)

(52) U.S. Cl. ...................... 715/762; 715/763
(58) Field of Classification Search ............... 715/809, 715/712, 708, 705
See application file for complete search history.

(56) References Cited

U.S. PATENT DOCUMENTS

| 4,901,221 | A | * | 2/1990 | Kodosky et al. | ............ 715/771 |
| 7,117,447 | B2 | * | 10/2006 | Cobb et al. | ................. 715/762 |
| 2005/0114240 | A1 | * | 5/2005 | Watson-Luke et al. | ........ 705/34 |

OTHER PUBLICATIONS

Screen shots of a Wizard Builder sold by SAP AG, 7 sheets.

* cited by examiner

*Primary Examiner*—Boris Pesin
(74) *Attorney, Agent, or Firm*—Fish & Richardson P.C.

(57) ABSTRACT

Techniques are provided that are useful in generating a software configuration program that makes the configuration process simpler and more efficient. The techniques are especially useful in configuring a software application that is complex and may involve multiple steps to configure the application properly. The techniques provide both a design-time software tool that is used to design the software configuration program and a run-time software tool that is used to manage and control the execution of the software configuration program.

12 Claims, 5 Drawing Sheets

SOFTWARE CONFIGURATION PROGRAM FOR SOFTWARE APPLICATIONS

TECHNICAL FIELD

This disclosure relates to creating and executing a software configuration program for configuring software applications.

BACKGROUND

Generally, configuring computer software applications can be a complicated task for end-users and developers of software applications. In some instances, a software configuration program, known as a 'wizard,' can be used to configure software applications. Typically, the wizard guides a user through a configuration process using one or more graphical displays that prompt the user for a response. The response received by the wizard is then used to configure the software application. For example, the software driver configuration for a printer attached to a personal computer may typically involve a wizard prompting a user to identify a device port on the personal computer to which the printer is attached.

Although software configuration programs generally have simplified configuration tasks for computer users, difficulties remain when software configuration programs are applied to configure complex software applications. Generally, software configuration programs may not ensure the proper selection of dependent tasks that are required to be sequenced while configuring complex software applications. Furthermore, users of software configuration programs typically are only able to determine whether selections made during the configuration process operate effectively once the software configuration process is complete.

SUMMARY

The invention provides techniques that are useful in generating a software configuration program that make the configuration process simpler and more efficient. The invention is especially useful in configuring a software application that is complex and that may involve multiple steps to configure the application properly. The invention provides both design-time software modules that are used to design the software configuration program, and run-time software modules that are used to manage and control the execution of the software configuration program.

In one general aspect, the invention provides a method that is executed as part of a process for creating an executable configuration program. The executable configuration program, in this case, includes multiple steps that are successively executed, and associated with each of the steps are user-selectable options. The method includes creating a rule that, during execution of the configuration program, determines which of the user-selectable options for a step are displayed when a specified user-selectable option of a previous step is selected. The method also includes binding the created rule to the specified selectable option so that during execution of the configuration program the rule is executed when the specified user-selectable option is selected.

In various implementations, the method may include one or more of the following additional features. For example, the method also may include creating a textual explanation of the step that describes available user-selectable options and binding the textual explanation to the step so that during execution of the software configuration program, the textual explanation is displayed for the step. The method also may include translating the textual explanation into a different language and binding the translated textual explanation to the step to be executed so that during execution of the step, the translated textual explanation is displayed. In addition, the method also includes evaluating the stability of a software application to be configured by simulating a selection of user-selectable options provided by the software configuration program and executing the software application using the simulated selection of user selectable options.

A system, as well as articles that include a machine-readable medium storing machine-readable instructions for implementing the various techniques, are also disclosed. Details of various implementations are discussed in greater detail below.

Various implementations of the invention have one or more of the following advantages. The binding of an executable rule to a user-selectable option avoids the improper selection of user-selectable options during a configuration process. As a result, a user may not need to confirm the accurate configuration of complex software applications through typical trial and error procedures because the system ensures that selected user-selectable options operate effectively with the software application being configured.

A further benefit of the system relates to the development and distribution of software configuration programs. For example, in some embodiments that feature translating textual descriptions into different languages, software developers using such features may no longer need to develop different software configuration programs for users of different languages. By establishing a textual explanation of user-selectable options in varied languages, only a single software configuration program needs to be deployed for different language users. Upon execution of the software configuration program, the textual explanation appropriate to the user of the different language can be displayed.

The details of one or more embodiments of the disclosure are set forth in the accompanying drawings and the description described below. Other features, objects, and advantages of the disclosure will be apparent from the description and drawings, and from the claims.

DESCRIPTION OF DRAWINGS

Like reference symbols in the various drawings indicate like elements.

DETAILED DESCRIPTION

Figure 1:
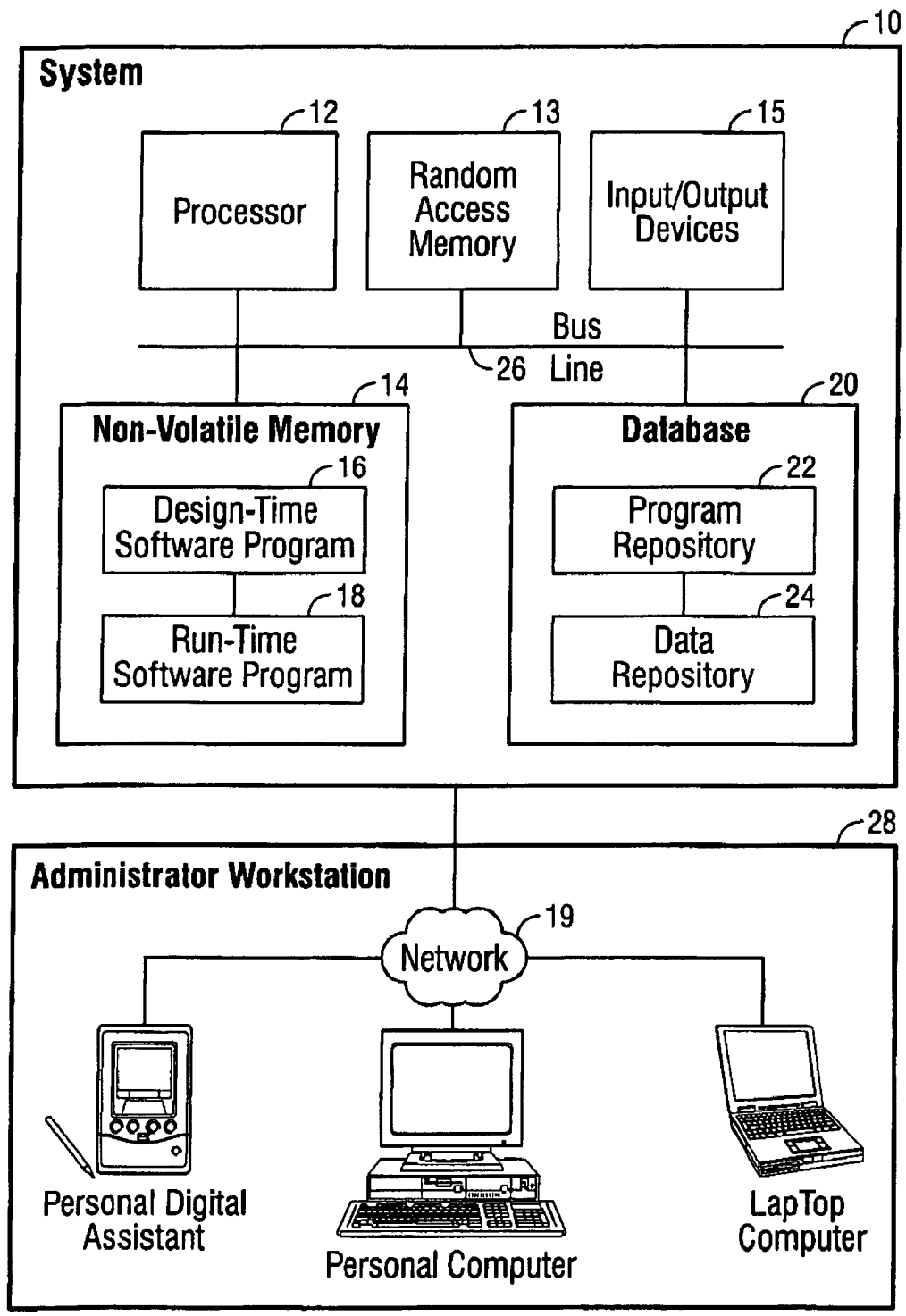
FIG. 1 is a block diagram of a networked computer system that may be used to design a configuration software program and to execute the configuration software program.

FIG. 1 illustrates a block diagram of a computer system 10 for the creation and execution of configuration software programs. The system 10 includes a processor 12, a random access memory (RAM) 13, an input/output device 15, a database 20, and a non-volatile memory 14. The non-volatile memory 14 is configured to include executable software programs, all of which are interconnected via a bus line 26 and controlled by processor 12. The executable software programs included in the non-volatile memory 14 are loaded into RAM 13 by processor 12 upon software program execution. The system 10 also includes an administrator workstation 28—such as a personal computer, a laptop computer, and/or a personal digital assistant—which is connectable to the system 10 via a network 19. The database 20 includes a program repository 22 in which executable configuration software programs created by the system 10 are stored, and a data repository 24 in which configuration data for software applications generated by the system 10 are stored. In some embodiments, the database 20 may be configured in the non-volatile memory 14. The network 19 may include various devices such as servers, routers and switching elements connected in an intranet, extranet or Internet configuration.

The user may use the administrator workstation 28 to access the computer system 10 over the network 19 using wireless or wired communication protocols. The administrator workstation 28 also may be coupled to I/O devices (not shown) that may include a keyboard in combination with a pointing device such as a mouse to input data into computer system 10, a storage resource such as a hard disk drive for storing and retrieving data for the administrator workstation 28, and/or other I/O devices.

In the system shown in FIG. 1, there is both a design-time software program 16 and a run-time software program 18. The design-time software program 16 is used to generate a configuration software program, which when generated is stored in the program repository 22. The run-time software program 18 is used for managing and controlling the execution of the configuration software program.

Figure 2:
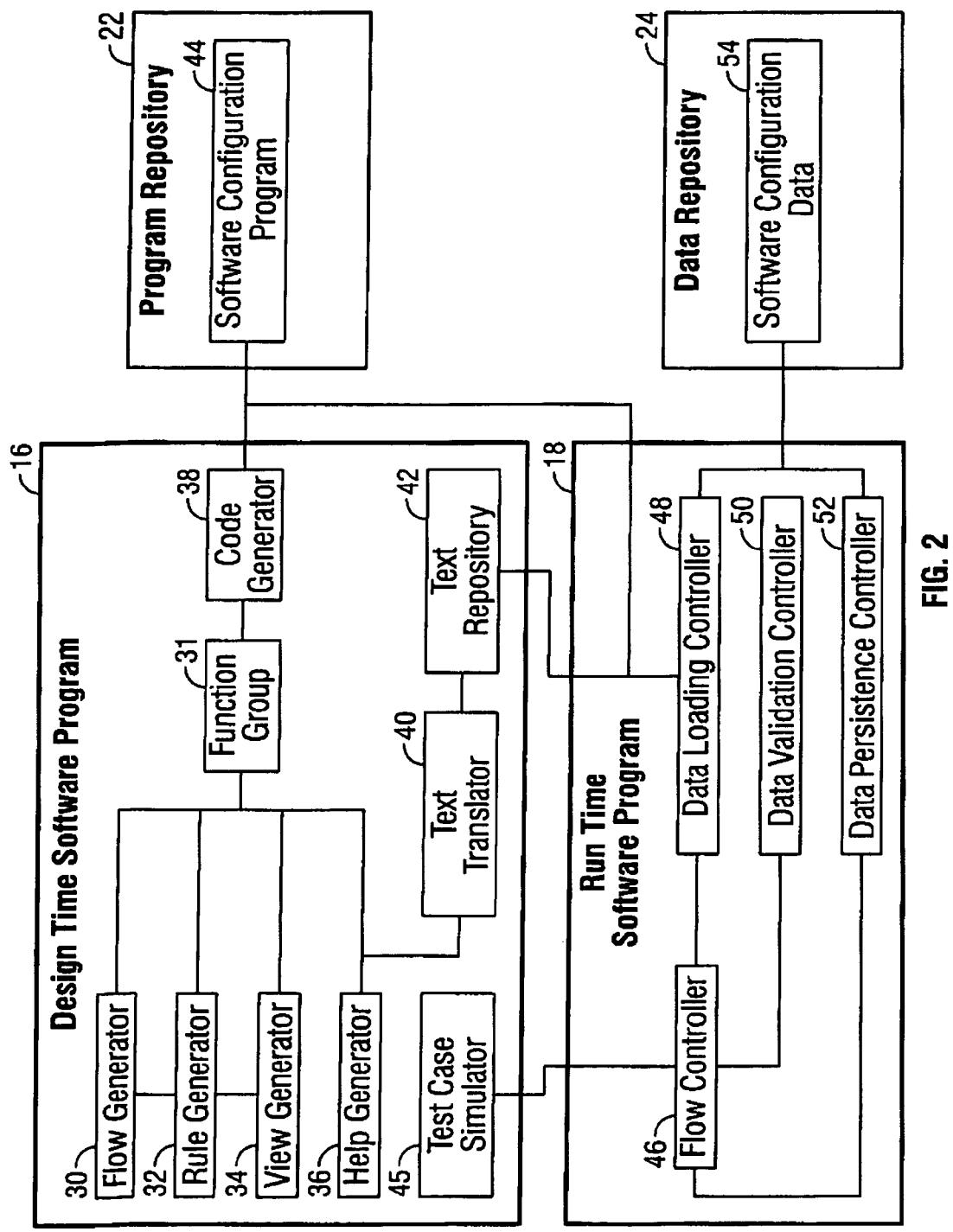
FIG. 2 shows more detail of some of the software modules included in the system of FIG. 1, and illustrates a method of using the system of FIG. 1 to design and execute a configuration software program.

FIG. 2 shows more detail of the FIG. 1 design-time software program 16 and the run-time software program 18. FIG. 2 also illustrates program flows for the software programs 16 and 18, which program flows result in, respectively, the software configuration program 44 shown stored in the program repository 22 and the software configuration data 54 shown stored in the data repository 24.

The design-time software program 16 is made up of several software modules. A flow-generator module 30 is provided that generates a function group 31 which is used by software modules included in the design-time software program 16 to store data objects used in generating the software configuration program 44. Briefly, the data objects stored in the function group 31 consist of (1) defined tasks to be executed by the software configuration program 44, (2) graphical user interfaces that are to be displayed upon execution of the defined tasks, and (3) any reference pointers to textual explanations that may be provided to the user upon execution of defined tasks.

The flow-generator module 30 displays a graphical user interface that prompts a user to define a command structure (e.g., steps and procedures) that is to be executed by software configuration program 44. The flow-generator module 30 allows the user to specify command structure definitions sequentially (e.g., step 1 followed by step 2). In some embodiments, the flow-generator module 30 also may allow the user to specify logical conditions that can affect the sequence of command structure execution (e.g., step 1 followed by step 3 if a certain logical condition exists, otherwise step 1 followed by step 2) depending upon the type of configuration required for a particular software application program. Once the command structure is defined, the flow-generator module 30 stores the defined command structure as an object in the function group 31.

In several embodiments, for example, the flow-generator module 30 also provides the ability to identify a graphical user interface (e.g., screen display) and a textual explanation (e.g., help documentation) that are associated with a particular step defined in the command structure. In one embodiment, for example, the flow-generator module 30 stores a graphical user interface identifier representing a graphical user interface to be displayed for a particular step in the function group 31. Similarly, if a textual explanation is identified for a particular step, the flow-generator module 30 stores a textual explanation identifier representing the textual explanation for the particular step in the function group 31.

A view-generator module 34 provides the ability to generate and bind a graphical user interface to the command structure defined by the flow-generator module 30. As described previously, once a graphical user interface for a step is identified, the flow-generator module 30 stores a graphical user interface identifier representing a graphical user interface associated with a particular step in the function group 31. The view-generator module 34 also provides the ability create graphical user interfaces that include 'user selectable options' (e.g., dialog boxes, buttons, check boxes, lists, menus, etc.). In one embodiment, for example, the view-generator module 34 provides a selectable palette of 'user selectable options' that can be arranged by the user to design a graphical user interface for a particular step defined in the command structure. Once the design of graphical user interfaces is complete, the view-generator module 34 stores the graphical user interface in the function group 31.

A rule-generator module 32 is provided and allows the user to define one or more rules that are to be executed by the software configuration program 44 when a particular event occurs. In one embodiment, for example, the rule-generator module 32 is accessible from the flow-generator module 30 and can be executed while defining the command structure for the software configuration program 44. Several benefits may stem from this design. For example, the command structure necessary to customize a software application may vary depending upon the particular computing environment the software application is installed on. Binding a rule to a particular step in the command structure of software configuration program 44 may allow only those steps necessary to configure a particular software application to be executed. As a result, the need to develop separate software configuration programs for software applications operating in various computing environments may be reduced.

The rule-generator module 32 also is accessible to the view-generator module 34 and can be used to bind a rule to 'user selectable options' defined for one graphical user interface that determines allowable 'user selectable options' on subsequent graphical user interfaces. Several benefits may stem from this design. One advantage relates to the efficiency of the configured software application. By binding a rule to one 'user selectable option' that determines allowable values for subsequent 'user selectable options' the system may ensure that configured software applications are configured as effectively as possible.

A help-generator module 36 provides a graphical user interface that allows a user to describe using free-form text the steps and 'user selectable options' available to a user during execution of software configuration program 44. In one embodiment, for example, the help-generator module 36 provides a free-form text area that allows a textual-explanation of 'user selectable options' to be specified. Once the textual-explanation is entered, the help-generator module 36 stores a pointer object representing the textual-explanation in the function group 31 and stores the text-explanation as a file in the text repository 42. In some embodiments, the help-generator module 36 also can invoke a text-translator module 40 that translates the textual-explanation into one or more different languages. The help-generator module 36 then stores the translated text as a file in the text repository 42.

Several advantages may stem from translating textual-explanations into different languages. For example, software configuration developers no longer may need to concern themselves with creating separate versions of a software configuration program for users of different languages. By providing the text-translator module 40, only one software configuration program may need to be developed and deployed to users of different languages.

Once the various software modules included in the design-time software program 16 have created and configured the function group 31, a code-generator module 38 is provided that generates the executable software configuration program 44. Typically, the code-generator module 38 includes constructor methods and a generate method that constructs the executable software configuration program 44. Once generated, the software configuration program 44 can be executed and display (1) the steps defined by the flow-generator module 30, (2) the graphical user interfaces generated by the view-generator module 34, and (3) any explanatory information generated by the help-generator module 36. As illustrated in FIG. 2, the code-generator module 38 stores the executable software configuration program 44 in the program repository 22.

As described previously, the program repository 22 provides storage for executable software configuration programs. In one embodiment, referring to FIG. 1, the database 20 is used to store the program repository 22. In another embodiment, a file-based system is used to store program repository 22. Although only a single program repository 22 is illustrated in FIGS. 1 and 2, the system may be configured to support multiple program repositories accessible over network 19.

Referring back to FIG. 2, the run-time software program 18 provides a set of software modules that provide execution control and management of the software configuration program 44. As illustrated in FIG. 2, one or more software modules are accessible to the run-time software program 18 from the design-time software program 16. In one embodiment, for example, a test-case simulator 45 is accessible to the run-time software program 18 from the design-time software program 16. The test-case simulator 45 provides a testing capability for the software configuration program 44. The test-case simulator 45 emulates the selection of 'user-selectable options' that may be selected by the user during execution of the software configuration program 44. For example, the software configuration program 44 may provide a first step having five 'user selectable options' and a successive step having three 'user selectable options.' The test-case simulator 45 can generate all the possible combinations of 'user-selectable options' that the user may select from the first step and the second step and then configure a software application using each of these possible combinations. Once the software application is configured for a particular emulated combination, the test-case simulator 45 then executes the configured software application program to ensure reliable configuration of the software application program using these options.

The run-time software program 18 also includes a flow-controller module 46, a data-loading module 48, a data-validation module 50, and a data-persistence module 52. The flow-controller module 46 provides execution control for the software configuration program 44. In one embodiment, for example, the flow-controller module 46 controls the sequential navigation of steps (e.g., step one followed by step two) that were defined by the design-time software program 16. As a result, the flow-controller module 46 ensures the proper configuration of a software application by providing a defined navigation between steps during execution of the software configuration program 44. In other embodiments, the flow-controller module 46 provides non-sequential navigation (e.g., step one followed by step N, where N may be any other defined step stored in the command structure) of steps defined by the flow-generator module 30. The non-sequential navigation of steps during execution can be triggered by execution of a rule defined for a particular step using the rule-generator module 32. In yet other embodiments, the functionality provided by the flow-controller module 46 may be included in the executable software configuration program 44 generated by the code-generator module 38.

A data-loading module 48 provides data access functionality for the software configuration program 44. In one embodiment, for example, graphical user interfaces generated by the view-generator module 34 may have user selectable parameters that require access to database information. The data-loading module 48 executes the data access methods associated with 'user selectable options' during execution of the software configuration program 44. In addition, as illustrated in FIG. 2, the data-loading module 48 also may access any textual-explanations defined for a particular step from the text repository 42 and provide the accessed textual-explanation to the software configuration program 44 during execution. One advantage of providing the data-loading module 48 may relate to loading an appropriate language description for a particular user familiar with a particular language. Another advantage may relate to software development efficiency. Since the textual-explanation associated with a particular step is not stored in the software configuration program 44, there is no need to maintain and create separate software configuration programs for various users of different languages. The data-loading module 48 provides the ability to access only that language appropriate for a particular user. Furthermore, by providing textual-explanations only when needed for a particular step, utilization of computer resources may be minimized.

The data-validation module 50 is provided and executes one or more rules defined by the rule-generator module 32 of the design-time software program 16. For example, a first parameter selection made by the user may cause the data-validation module 50 to execute one or more rules that can limit or enhance 'user selectable options' displayed in subsequent steps.

Once the user of the software configuration program 44 determines that the configuration is correct, the data-persistence module 52 provides for storage of the software application configuration data 54 entered by the user. In one embodiment, shown in FIG. 8., the data-persistence module 52 also can provide a confirmation display that prompts the user to confirm that specified 'user-selectable options' specified during execution of the software configuration program 44 are accurate. Once the data is confirmed, the data-persistence module 52 stores the software application configuration data 54 in the data repository 24.

The data repository 24 provides storage for software configuration data 54 generated by the software configuration program 44. In one embodiment, referring to the FIG. 1 example, the database 20 is used to store the data repository 24. In other embodiments, the data repository 24 is a file-based system that stores software configuration data. Although only a single data repository 24 is illustrated in FIGS. 1 and 2, the system may be configured to support multiple data repositories accessible over network 19.

Figure 3:
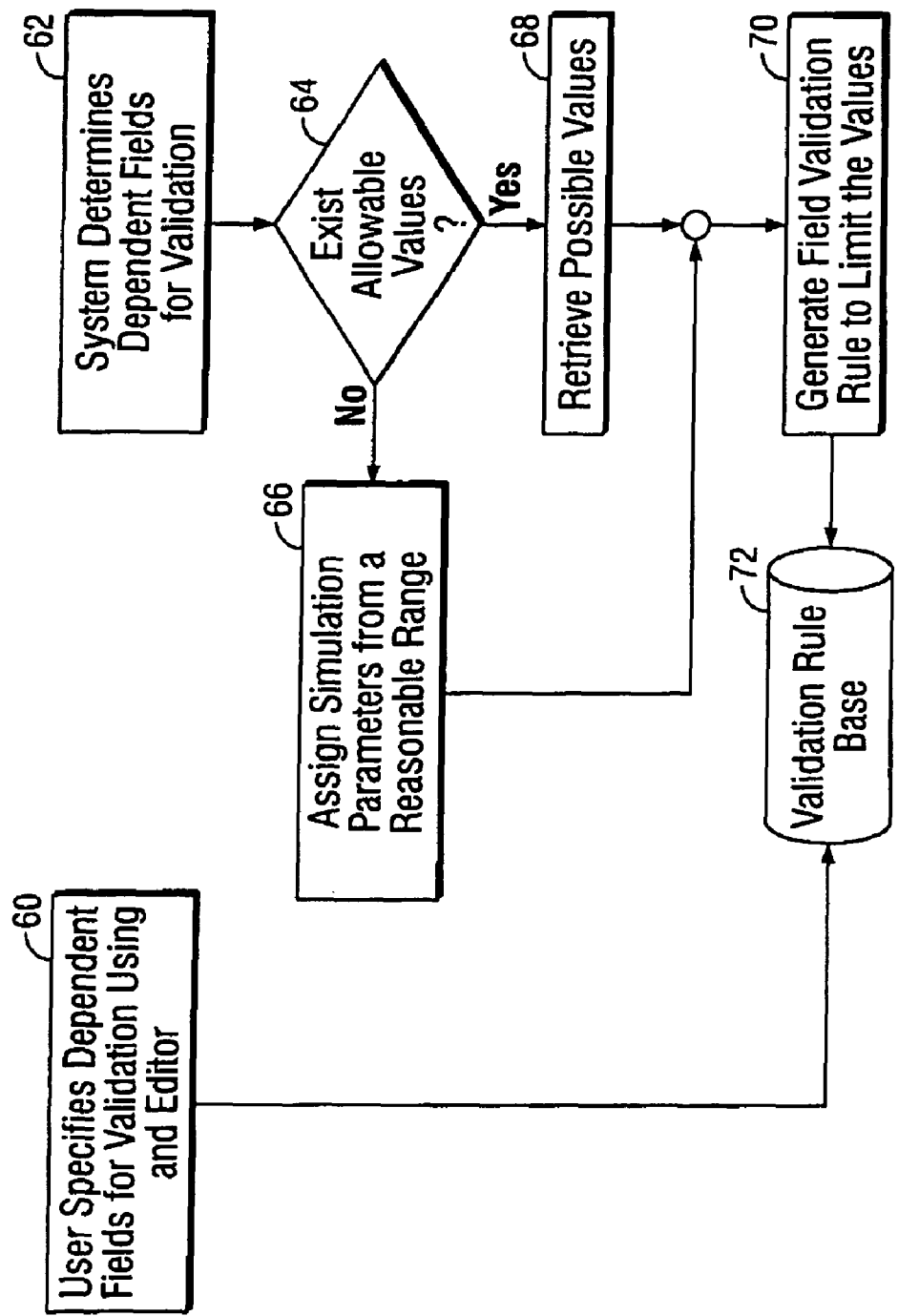
FIG. 3 is a block diagram illustrating a method that may be used to generate a validation rule.

FIG. 3 is a block diagram illustrating a method that may be used to generate a validation rule. As shown in FIG. 3, the method includes providing an editor that allows the user to specify possible value validation rules 60 for each 'user selectable option' specified with the view-generator 34. For example, using the editor, a user may specify a validation rule requiring that, "if field-1 has value 'A', the field-2 value must be greater than 100." Once a validation rule is specified, the rule editor stores the validation rule in a validation rule base 72 that is accessed during execution of the software configuration program 44. An example of a graphical user interface for specifying validation rules is disclosed in FIG. 5.

The method also includes automatically deriving validation rules from data models that may exist in the system. Some data models, such as SAP's data model, provide an ability to define and link validation values for data fields. These data models support entity relationship models that can be used to generate validation rules. The method includes first determining the dependent fields that have been defined in the data model 62. Next, for each data entry field defined in the data model, a determination of whether allowable values have been previously defined in the data model is performed 64. If allowable values have been previously defined, the validation rule is generated 70 using these previously defined values and is stored in validation rule base 72.

Alternatively, if allowable data values have not been previously defined, the method includes determining allowable data values by calculating a value range using previous transactions 66. For example, a data field representing 'price' may have transactions associated with it ranging from $5.00 to $200.00. In this case, the allowable data values for the 'price' data field will be between $5.00 and $200.00. Once the value range is calculated, the validation rule is generated 70 using the value range and is stored in validation rule base 72.

Figure 4:
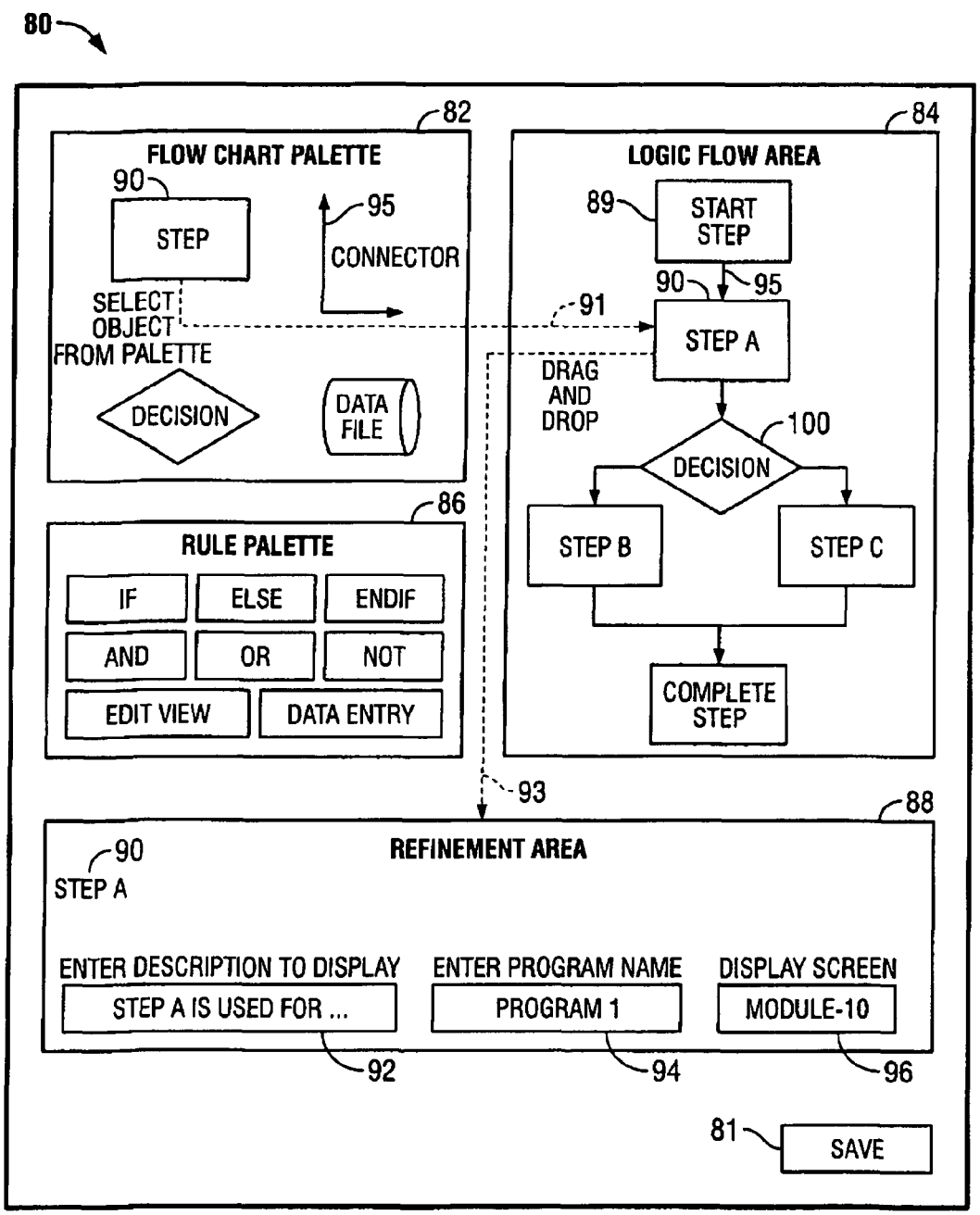
FIGS. 4 and 5 are diagrams of an example of a graphical user interface for designing a configuration software program.
Figure 5:
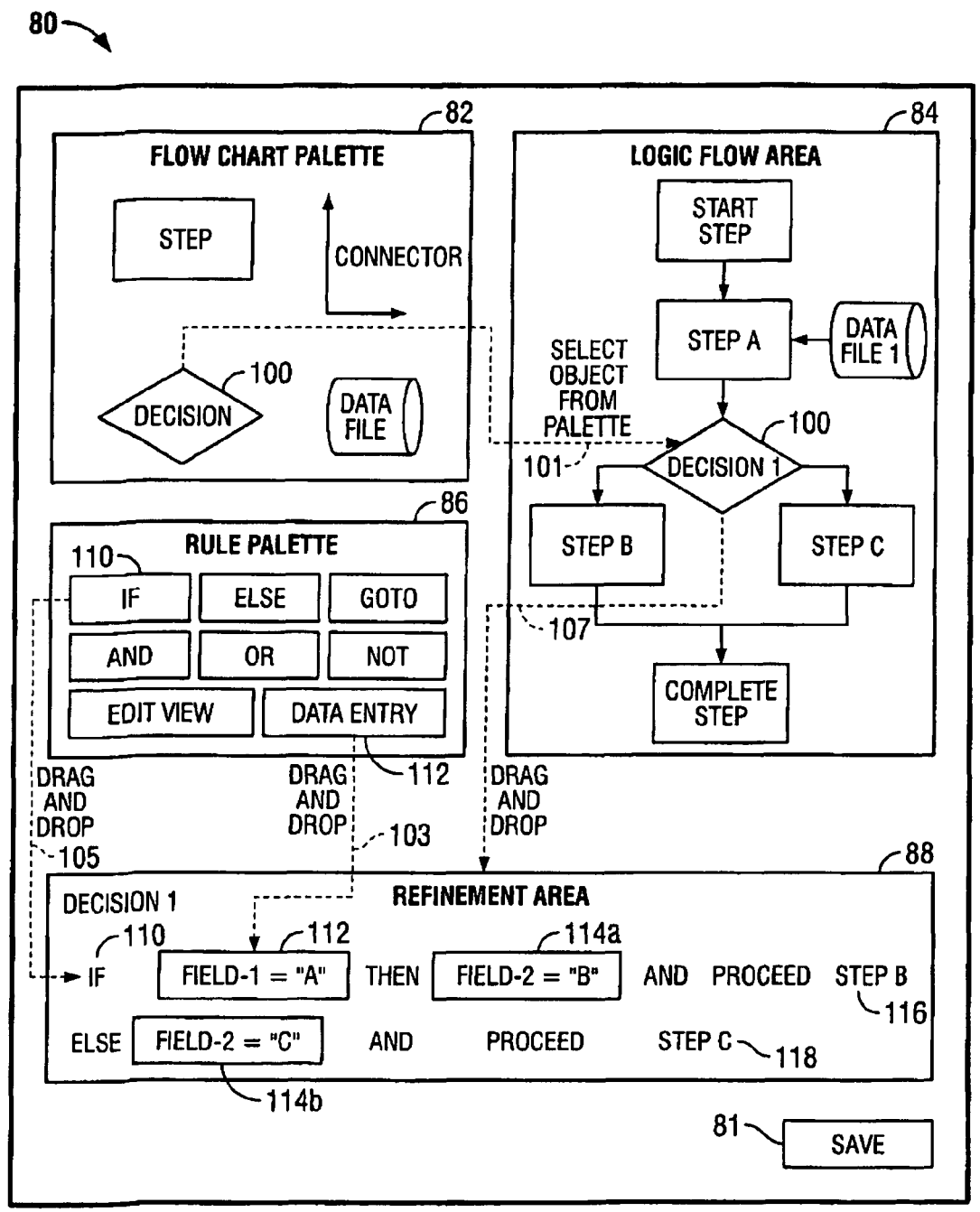

FIGS. 4 and 5 illustrate an example of a graphical user interface 80 displayed by design-time software program 16 for defining tasks to be executed by the software configuration program 44. Referring to FIG. 4, the graphical user interface includes a flow chart palette 82, a logic flow area 84, a rule palette 86, and a refinement area 88.

Flow chart palette 82 provides several user-selectable objects that include generic tasks that can be configured and executed by the software configuration program 44. As shown in FIG. 4, for example, a user may select a 'STEP' task 90 from flow chart palette 82 and drag and drop this task 91 to the logic flow area 84.

Logic flow area 84 is a drawing area that provides functionality for defining the command structure of the software configuration program 44. As shown in FIG. 4, user-selectable tasks can be dragged and dropped onto the logic flow area 84. Once the task is copied onto the logic flow area 84, the task may be renamed and associated with other tasks in the flow logic area 84 through the use of one or more connectors 95 available from flow chart palette 82. For example, as shown in FIG. 4, the 'STEP' task 90 is renamed to 'STEP A' and is configured as a subsequent process to a 'START STEP' task 89 using the connector 95.

Refinement area 88 is a design space wherein further configuration details relating to tasks arranged in logic flow area 84 can be specified. Refinement area 88 is activated when a task from logic flow area 84 is copied to it. For example, as shown in FIG. 4, upon the drag and drop 93 of the 'STEP A' task 90 onto refinement area 88, the refinement area 88 prompts the user to specify an explanatory text 92 that is to be displayed to the user during execution of the software configuration program 44. As described previously, explanatory texts may provide additional guidance regarding the step being executed by the software configuration program 44.

Once the defined task and the explanatory text 92 are specified and the user selects the save option 81, the design-time software program 16 passes the defined task to the flow-generator module 30 to create the command structure in the function group 31. Also, the explanatory text is passed to the help-generator module 36 that stores a pointer object representing the textual explanation for the task in the function group 31 and stores the text explanation as a file in the text repository 42. As a result, the defined task stored in the command structure is bound to the explanatory text in the function group 31.

Refinement area 88 also prompts the user to identify a display screen 96 that is to be displayed to the user during execution of a task by the software configuration program 44. For example, the display screen entitled 'MODULE-10' 96 is to be displayed to the user during execution of task 'STEP A' 90. As is also shown in the FIG. 4 example, the user may be prompted to specify a program name 94 containing the display screen 96. As such, the refinement area 88 provides the ability to specify the programs that contain display screens for various tasks that are to be executed by the software configuration program 44. Once the display screen has been identified for the defined task, the design-time software program 16 passes the defined tasks and identified display screen to the view-generator module 34, which binds the defined task to the display screen and stores them in the function group 31.

Referring now to FIG. 5, once a decision task 100 configured in the flow logic area 84 is copied 107 to the refinement area 88, the refinement area 88 provides the ability to bind instructions to tasks and 'user-selectable options'.

The rule palette 86 provides several conditional operators (e.g., 'IF', 'AND', 'ELSE', 'OR', etc.) and entry fields (i.e., input areas where 'user-selectable options' can be specified) that can be arranged together to express rules that are to be executed by the software configuration program 44 during run-time. For example, upon copying the 'DECISION 1' task 100 to the refinement area 88, the rule palette 86 is activated. Once the rule palette 86 is activated, conditional operators and entry fields can be copied 105 to the refinement area 88 and arranged to establish a rule. For example, as shown in FIG. 5, copying and arranging conditional operators and entry fields establishes a rule that when executed, determines whether 'STEP B' 116 or 'STEP C' 118 is to be executed and whether 'FIELD-2' shall have a value of 'B' 114a or 'C' 114b depending upon the value of 'FIELD-1' 112 during run-time.

As a result, the refinement area 88 provides the ability to bind instructions that are to be executed upon a user selection of a 'user-selectable option'. Once these rules are bound, user selection of the 'user-selectable option' during execution of the software configuration program 44 triggers execution of the rule. In some embodiments, execution of a rule bound to a user-selectable option modifies subsequent user-selectable options presented to the user during execution of the software configuration program 44.

Various features of the system discussed above may be implemented using circuitry, such as a processor, or other hardware, software, or a combination of hardware and software. For example, some features of the system may be implemented in computer programs executing on programmable computers. Each program may be implemented in a high level procedural or object-oriented programming language to communicate with a computer system or other machine. Furthermore, each such computer program may be stored on a storage medium such as read-only-non-volatile memory (ROM) readable by a general or special purpose programmable computer or processor, for configuring and operating the computer to perform the functions described above.

Other implementations are within the scope of the claims.

What is claimed is:

1. A method to be executed as part of a process for creating an executable configuration program that comprises multiple steps that are successively executed and wherein associated with each of the steps are user-selectable options, the method comprising:

generating a user interface including at least (i) a logic flow area for a user to define a command structure for the configuration program including at least one step, (ii) a refinement area for the user to specify a configuration detail regarding a step arranged in the logic flow area, and (iii) a rule palette for the user to create a rule, wherein the rule palette provides multiple conditional operators and entry fields;

creating and storing in a repository the rule that during execution of the configuration program determines which of the user-selectable options for the step are displayed when a specified user-selectable option of a previous step is selected, wherein the step and the previous step are arranged in the logic flow area and the user specifies the rule in the refinement area;

binding the rule in the repository to the specified user-selectable option so that during execution of the configuration program the rule is executed when the specified user-selectable option is selected;

creating and storing in the repository a textual explanation of the step that describes available user-selectable options for the step;

and binding the textual explanation in the repository to the step so that during execution of the configuration program the textual explanation of the step is displayed.

2. The method of claim 1 wherein the binding of the rule to the specified user-selectable option is performed by virtue of a designer selecting a user-selectable option for which to create the rule.

3. The method of claim 1 wherein creating the textual explanation comprises translating the textual explanation into at least one different language.

4. The method of claim 1 further comprising evaluating the stability of a configured software application by executing the software application using a simulated user-selectable option.

5. A system comprising:

a computer network;

a service delivery device coupled to the network, the service delivery device including a processor and memory storing instructions that, in response to receiving a first type of request for access to a service, cause the processor to:

create an executable configuration program that comprises multiple steps that are successively executed and wherein associated with each of the steps are user-selectable options;

generate a user interface including at least (i) a logic flow area for a user to define a command structure for the configuration program including at least one step, (ii) a refinement area for the user to specify a configuration detail regarding a step arranged in the logic flow area, and (iii) a rule palette for the user to create a rule, wherein the rule palette provides multiple conditional operators and entry fields;

create and store in a repository the rule that during execution of the configuration program determines which of the user-selectable options for a step are displayed when a specified user-selectable option of a previous step is selected, wherein the step and the previous step are arranged in the logic flow area and the user specifies the rule in the refinement area;

bind the rule in the repository to the specified user-selectable option so that during execution of the configuration program the rule is executed when the specified user-selectable option is selected;

create and store in the repository a textual explanation of the step that describes available user-selectable options for the step; and bind the textual explanation in the repository to the step so that during execution of the configuration program the textual explanation of the step is displayed.

6. The system of claim 5 wherein the memory stores instructions that, in response to receiving the first type of request, cause the processor to bind the rule to the specified user-selectable option by providing an ability to select a user-selectable option for which to create the rule.

7. The system of claim 5 wherein the memory stores instructions that, in response to receiving the first type of request, cause the processor to translate the textual explanation into at least one different language.

8. The system of claim 5 wherein the memory stores instructions that, in response to receiving the first type of request, cause the processor to evaluate the stability of a configured software application by executing the software application using a simulated user-selectable option.

9. A computer-readable storage device comprising instructions that, when executed by a processor, cause the processor to:

create an executable configuration program that comprises multiple steps that are successively executed and wherein associated with each of the steps are user-selectable options;

generate a user interface including at least (i) a logic flow area for a user to define a command structure for the configuration program including at least one step, (ii) a refinement area for the user to specify a configuration detail regarding a step arranged in the logic flow area, and (iii) a rule palette for the user to create a rule, wherein the rule palette provides multiple conditional operators and entry fields;

create and store in a repository the rule that during execution of the configuration program determines which of the user-selectable options for a step are displayed when a specified user-selectable option of a previous step is selected, wherein the step and the previous step are arranged in the logic flow area and the user specifies the rule in the refinement area;

bind the rule in the repository to the specified user-selectable option so that during execution of the configuration program the rule is executed when the specified user-selectable option is selected;

create and store in the repository a textual explanation of the step that describes available user-selectable options for the step;

and bind the textual explanation in the repository to the step so that during execution of the configuration program the textual explanation of the step is displayed.

10. The storage device of claim 9 including instructions that, when executed by the processor, cause the processor to bind the rule to the specified user-selectable option by providing an ability to select a user-selectable option for which to create the rule.

11. The storage device of claim 9 including instructions that, when executed by the processor, cause the processor to translate the textual explanation into at least one different language.

12. The storage device of claim 9 including instructions that, when executed by the processor, cause the processor to evaluate the stability of a configured software application by executing the software application using a simulated user-selectable option.

* * * * *